United States Patent [19]

Samii

[11] Patent Number: 5,657,132
[45] Date of Patent: Aug. 12, 1997

[54] SAFETY INTERLOCK SWITCH HAVING COMBINED FUNCTIONS

[75] Inventor: Morad M. Samii, Poway, Calif.

[73] Assignee: Hewlett-Packard Company, Palo Alto, Calif.

[21] Appl. No.: 437,198

[22] Filed: May 8, 1995

[51] Int. Cl.$^6$ ........................................ B41V 2/07
[52] U.S. Cl. .................... 358/296; 347/263; 347/170
[58] Field of Search .................... 358/296; 347/108, 347/152, 170, 222, 263; 399/107, 114, 125; 346/145

[56] References Cited

U.S. PATENT DOCUMENTS 4,435,722  3/1984  Kato ........................................ 347/152

*Primary Examiner*—Peter S. Wong
*Assistant Examiner*—Gregory Toatley, Jr.

[57] ABSTRACT

In the preferred embodiment, an interlock switch is located on a first of two access doors of a printer. The second access door has an upwardly extending protuberance near its end. The switch is actuated for enabling the system by closing the second access door followed by closing the first access door. The protuberance on the second access door pushes upwardly on an arm of the switch as the first access door is closed, thus actuating the switch. This not only provides a reliable safety mechanism by insuring that the doors are properly closed, but eliminates the cost of a separate safety interlock switch for each access door.

20 Claims, 3 Drawing Sheets

SAFETY INTERLOCK SWITCH HAVING COMBINED FUNCTIONS

FIELD OF THE INVENTION

This invention relates to safety interlock switches in a printing device and, in particular, to safety interlock switches for preventing unintentional contact with rotating rollers or other moving parts within a printing device.

BACKGROUND OF THE INVENTION

It is conventional to incorporate a safety interlock switch in printers, copiers, or the like, to prevent a user from being injured by moving parts within the device when an access door is opened. A safety interlock switch is automatically actuated when an access door is opened. Actuation of the switch prevents potentially dangerous components from being energized. These potentially dangerous components typically include feed rollers, high voltage devices, and scanning print carriages. Generally, each access door which allows access to such potentially dangerous components has its own associated interlock switch for detecting the opening of that access door. The cost for those switches and supporting hardware, as well as the labor cost for incorporating these switches, thus increases with additional access doors.

What is needed is a safety interlock system for a printing device with multiple access doors which is less expensive than conventional interlock systems.

SUMMARY OF THE INVENTION

In one embodiment of the invention, a combined printer, facsimile, and copy machine is provided with two separate access doors which comprise its top covers. Opening of one access door gains access to the scanning print carriage and paper feed rollers for the printer. The other access door provides access to the paper separator feed rollers for the facsimile and copy portion of the machine. If either access door is open, a single switch interlock mechanism is actuated which prevents both the printer portion and the facsimile/copier portion from operating.

In the preferred embodiment, the interlock switch is located on a first of two access doors. The second access door has an upwardly extending protuberance near its end. The switch is actuated for enabling the system by closing the second access door followed by closing the first access door. The protuberance on the second access door pushes upwardly on an arm of the switch as the first access door is closed, thus actuating the switch. This not only provides a reliable safety mechanism by ensuring that the doors are properly closed, but eliminates the cost of a separate safety interlock switch for each access door.

DETAILED DESCRIPTION OF THE PREFERRED EMBODIMENTS

Figure 1:
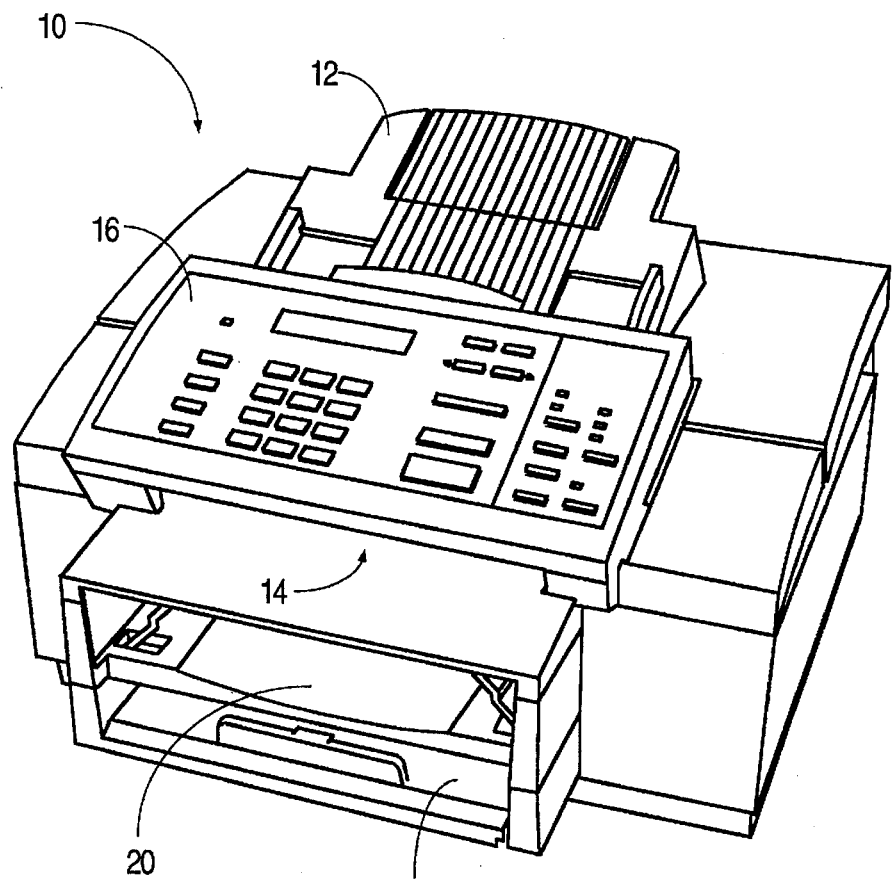
FIG. 1 is a front perspective view of a combined printer/facsimile/copying machine which incorporates the present invention.

A preferred embodiment of the invention is illustrated in FIG. 1. FIG. 1 illustrates a combined printer, facsimile, and copying machine 10.

For facsimile transmission and for copying, a stack of paper to be faxed or copied is manually placed on loading tray 12. This paper is automatically fed through the machine 10, one sheet at a time, using a separating roller and feed rollers, and optically read for copying or facsimile transmission. These sheets exit through slot 14. A display and control panel 16 is provided for inputting the control data for printing, facsimile transmission, or copying.

In the printer mode, the machine 10 is under the control of a conventional host computer. For printing in either of the printer, facsimile, or copier modes, blank paper in tray 18 is fed into machine 10 via feed rollers and is printed upon by a scanning print mechanism. The printed paper is then outputted into output tray 20.

The preferred machine 10 is approximately 17.25 inches in width, 15.5 inches in depth, and 11.125 inches in height.

Figure 2:
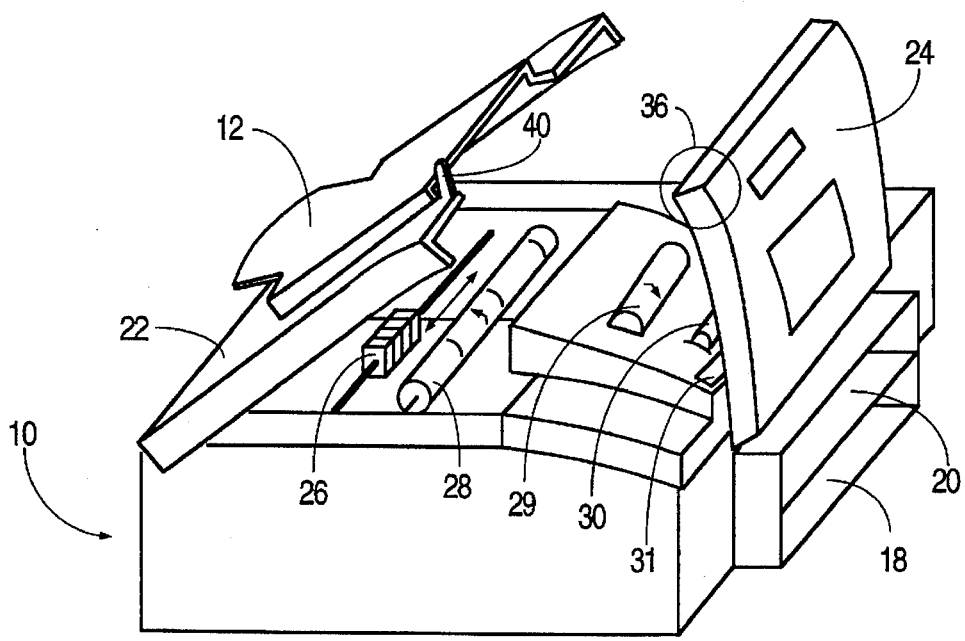
FIG. 2 is a simplified side perspective view of the machine of FIG. 1 with its two access doors opened to reveal the mechanisms inside the device.

FIG. 2 is a simplified embodiment of the machine 10 of FIG. 1 with its printer access door 22 opened and its facsimile/copy access door 24 opened. Opening access door 22 gains access to the printing mechanism, and opening access door 24 gains access to the facsimile/copying mechanism.

The exposed printing mechanism in the preferred embodiment includes a scanning carriage 26 on which is mounted one or more print cartridges, such as inkjet print cartridges. The scanning carriage 26 scans back and forth across the paper to be printed upon. After each scan, the paper is shifted an incremental amount using a feed roller 28 or a combination of rollers. For simplicity, only a single feed roller 28 is shown exposed by opening access door 22. Additional rollers (not shown) are used to separate sheets from tray 18 and output sheets into tray 20 after printing. These additional rollers may also be exposed by opening access door 22.

The exposed facsimile/copying mechanism includes a rotatable roller 29 for separating the sheets of paper placed into tray 12 (FIG. 1). Also exposed are feed rollers, such as roller 30, downstream from roller 30 for transporting the sheets over the optical reading window 31. Conventional photoelectric elements are located beneath window 31 for converting printed matter on the sheets to electrical signals.

For safety purposes, a safety interlock system is provided in machine 10 to disable the rotation of the various paper rollers and the scanning of the carriage 26 when either of access doors 22 or 24 is opened. This is to prevent injury to the user due to the movement of such parts.

A typical safety interlock scheme would provide a separate safety interlock switch for each access door 22 and 24 and use conventional means connected to each access door 22 and 24 to actuate their respective interlock switches.

In the embodiment of machine 10, however, only a single interlock switch is provided, which thus reduces the cost of the parts as well as the labor involved in manufacturing the machine 10.

Figure 3:
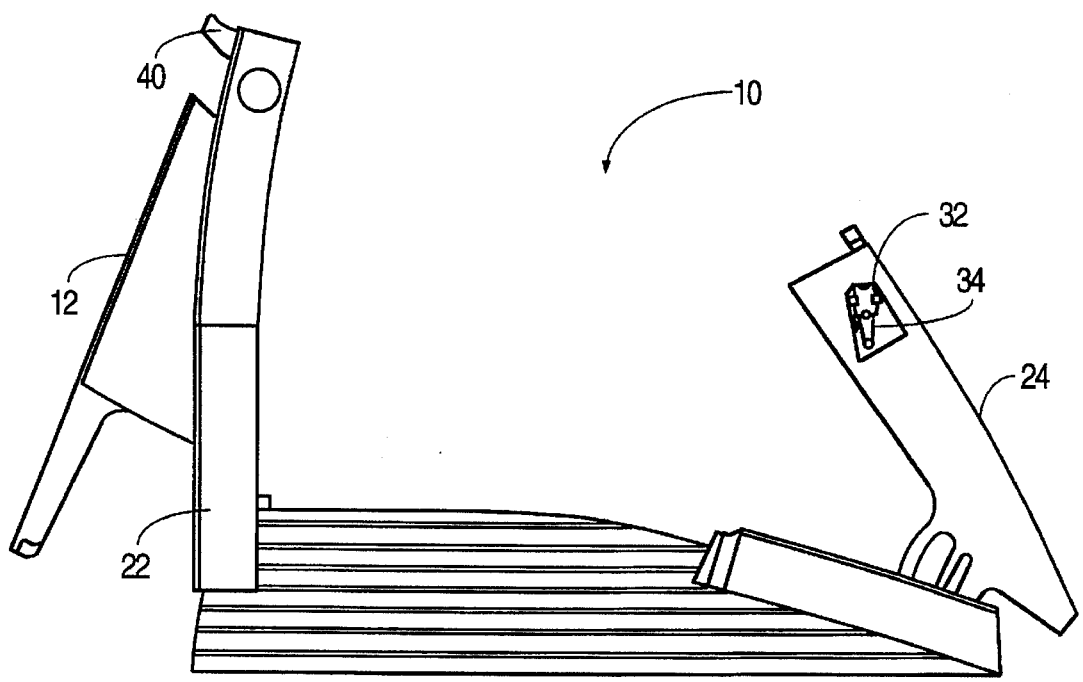
FIGS. 3, 5, 6, and 7 are elevated side views of the machine of FIG. 1 with its two access doors being in various states.
Figure 5:
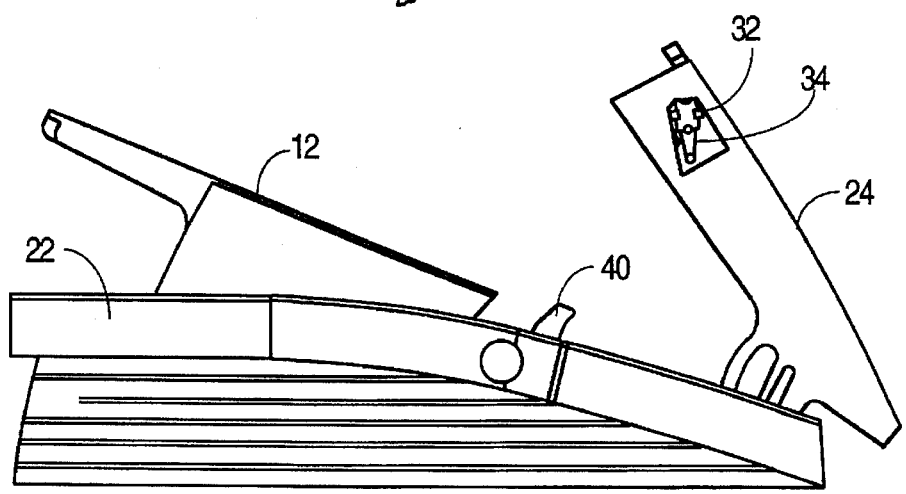
Figure 6:
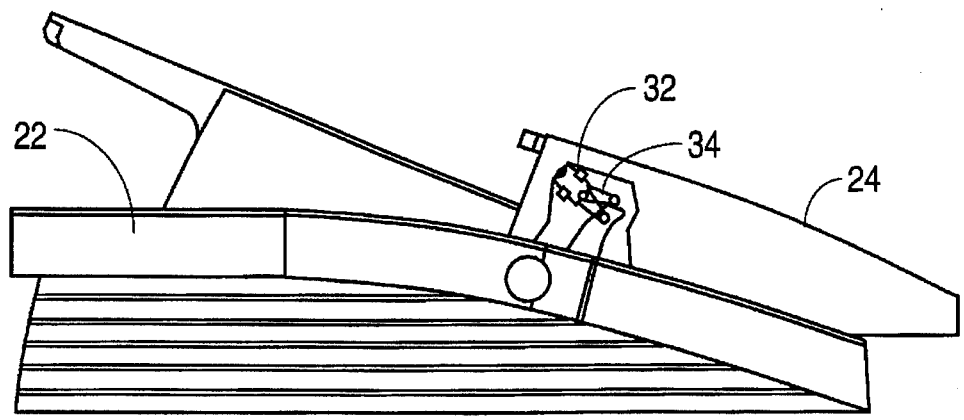

FIGS. 3, 5, 6, and 7 are elevated side views of machine 10 with the access doors 22 and 24 in various states. The side of access door 24 is partially cut away to reveal a safety interlock switch 32. Switch 32 in one embodiment is a simple two-terminal momentary switch whose terminals are isolated from one another when the switch is in a normal state, such as shown in FIG. 3, and whose terminals are shorted to one another when both access doors 22 and 24 are properly closed, as shown in FIG. 6. Switch 32 includes a spring-loaded actuating arm 34, shown in FIG. 3 in its normal position.

Figure 4:
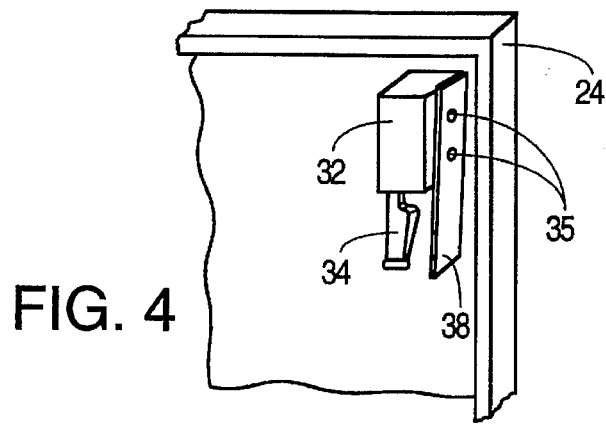
FIG. 4 is a magnified portion of the underside of one access door in FIG. 2.

FIG. 4 is a magnified view of the edge of access door 24 looking up from below door 24, corresponding to the circled portion 36 in FIG. 2. Switch 32 is simply mounted on a plastic flange 38, extending from beneath access door 24, using plastic tabs 35.

Referring back to FIG. 3, access door 22 includes a plastic protuberance 40 (also shown in FIG. 2) which contacts actuating arm 34 when access door 22 is closed first, followed by access door 24, as illustrated in FIGS. 5 and 6. In FIG. 5, access door 22 is closed and access door 24 remains open. In this case, even though the printing mechanism is now blocked by access door 22, the safety interlock switch 32 is still in an open state and, thus, still disables the printing mechanism as well as the facsimile and copying mechanism.

In FIG. 6, the access door 24 is now closed, and the act of such closure causes protuberance 40 to push spring-loaded arm 34 upward to close the contacts of switch 32. Arm 34 is shown in both its up and down positions to illustrate this action. In one embodiment, the length of protuberance 40 is approximately one inch. The shorting of the contacts of switch 32 is detected by an electrical circuit (FIG. 8) within machine 10 to now enable the various printing, copying, and facsimile mechanisms.

Figure 7:
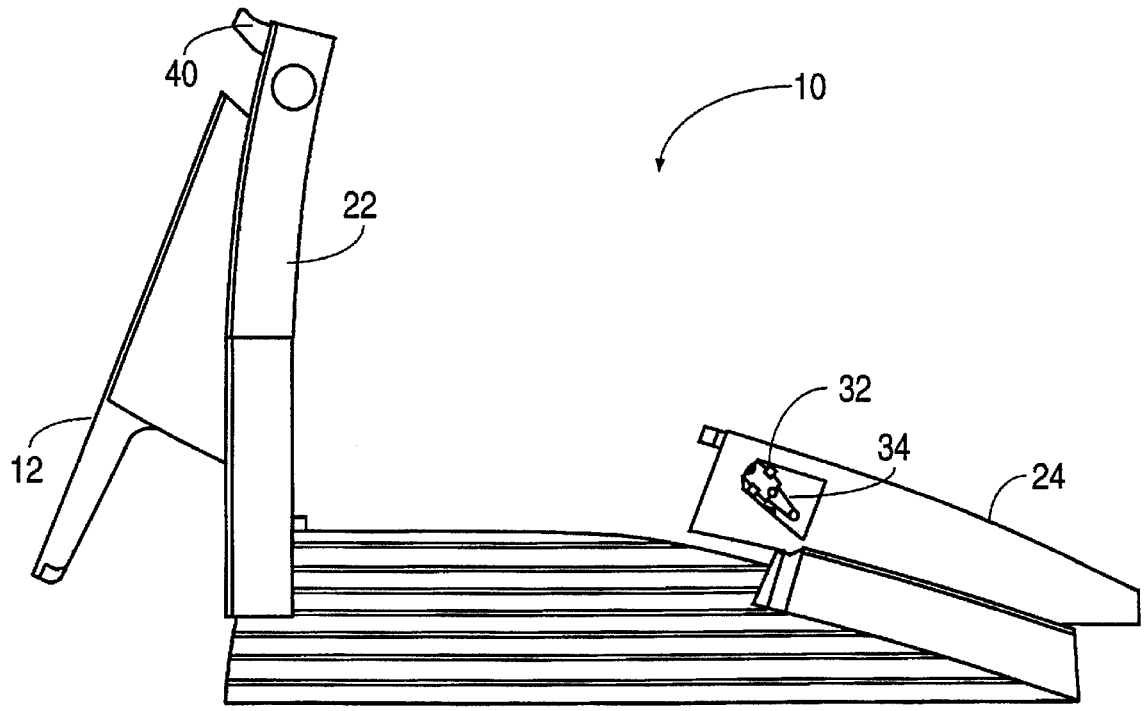

FIG. 7 illustrates a situation where access door 24 is closed before access door 22. In this case, although the facsimile and copying mechanism is blocked, switch 32 is still not actuated, and the printing, copying, and facsimile mechanisms are disabled. If access door 24 is first closed, access door 22 cannot be closed. Hence, in the preferred embodiment, the doors must be closed in the proper sequence in order for switch 32 to be actuated.

Figure 8:
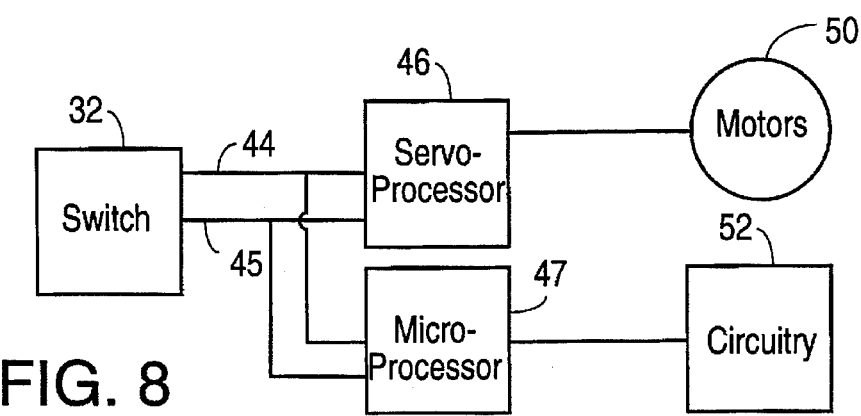
FIG. 8 is a block diagram illustrating the function of the switch in disabling the mechanisms within the machine of FIG. 1.

FIG. 8 is a functional block diagram showing the two wires 44, 45 leading from switch 32 being applied to terminals of a servo-processor 46 and microprocessor 47. The servo-processor 46 controls the drive signals for the various paper feed roller stepper motors 50 as well as for the scanning carriage 26 stepper motor. The paper feed rollers include rollers 28, 29, and 30 in FIG. 2 as well as any additional rollers used to transport sheets. When servo-processor 46 detects that wires 44 and 45 are open-circuited, it prevents drive signals from being applied to the various stepper motors 50.

Microprocessor 47 controls various electronic circuitry 52 within machine 10 as well as detects the state of switch 32. When microprocessor 47 detects that switch 32 is open, it freezes the various states of the electronic circuitry 52 so that data will not be lost when the access doors 22 and 24 are again closed and the printing, facsimile, or copying operation is continued.

In the event of paper jams and other malfunctions of the machine, sensors within the machine 10 automatically halt operation of the machine. In response to such a malfunction, a prompt regarding the malfunction may appear on a display screen within display panel 16 (FIG. 1) and the user will be required to clear the malfunction. This will frequently require the user to open access doors 22 and 24 to signal to the machine 10 that the paper jam or the malfunction has been cleared. Access door 22 will also have to be opened when changing a print cartridge.

Since only a single switch is used in the preferred embodiment, the logic needed to detect a safety interlock situation is greatly simplified over the systems where two or more switches are used, and the parts cost and manufacturing costs are also reduced.

Switch 32 may also be a normally closed type where the contacts are normally shorted. Servo-processor 46 and microprocessor 47 would then disable the machine 10 upon detection of the contacts being open-circuited.

In another embodiment of the invention, the switch 32 is located in either access door 22 or in the body of machine 10. In such cases, an actuating device on one or both doors 22 and 24 would trigger the single switch when both doors 22 and 24 are closed. The switch 32 may also be an optical switch or other well known type of switch.

Although the preferred embodiment of the invention is a combined printer/facsimile/copying machine, this invention may be applied to any type of consumer printing device having rollers or other potentially dangerous parts. The components revealed by access doors 22 and 24 may also be different portions of a single purpose machine.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A printing machine comprising:
    a housing containing a printing mechanism, said housing having at least a first section and a second section, said first section including a first group of mechanical components, said second section including a second group of mechanical components;
    a first access door connected to said housing for gaining access within said first section of said housing;
    a second access door connected to said housing for gaining access to said second section of said housing;
    a safety interlock switch having terminals electrically connected to control circuitry within said housing, said control circuitry enabling said first group of mechanical components and said second group of mechanical components only when said switch is in an enable state, said switch being mounted on said machine so as to be actuated into said enable state only when both said first access door and said second access door are closed.

2. The machine of claim 1 wherein said first section contains a printer mechanism for a printing on paper sheets and forwarding said sheets through a print zone, and said second section contains an optical reading portion and a forwarding roller portion for transporting a sheet containing printed matter across said optical reading portion.

3. The machine of claim 2 wherein said second section provides a combined copying and facsimile function.

4. The machine of claim 1 wherein said switch is mounted on said second access door and has an actuator protruding from said switch, wherein said machine further comprises:
    a protuberance extending from said first access door which, when said first access door is closed, physically contacts said actuator on said switch to actuate said switch to its enable state as said second access door is closed after said first access door is closed.

5. The machine of claim 4 wherein said first group of mechanical components and said second group of mechanical components comprise one or more paper feed rollers and one or more drive motors for said rollers.

6. The machine of claim 5 further comprising a servo-processor connected to said switch, said servo-processor enabling said drive motors upon detection that said switch is in its enable state.

7. The machine of claim 4 wherein said printing mechanism comprises a scanning print carriage.

8. The machine of claim 4 wherein said first group of components includes a scanning print carriage, and said second group of components includes a paper separator roller for a facsimile machine.

9. The machine of claim 4 wherein said second group of components includes a scanning print carriage, and said first group of components includes a paper separator roller for a facsimile machine.

10. The machine of claim 1 wherein said switch is only actuated to be in said enable state if said first access door is closed before said second access door is closed.

11. A method for actuating a safety interlock switch for disabling mechanisms within a printing machine comprising the steps of:
   closing a first access door on a housing containing movable mechanisms, closing said first access door preventing a user from gaining access within a first section of said housing; and
   closing a second access door on said housing, closing said second access door preventing said user from gaining access within a second section of said housing, said step of closing said second access door after said first access door is closed causing a safety interlock switch mounted on said housing to be actuated to enable mechanisms within said first section and said second section of said housing.

12. The method of claim 11 wherein said switch is mounted on said second access door, and wherein said step of closing said second access door causes a protuberance on said first access door to contact an actuator of said switch to change a state of said switch as said second access door is closed, actuating said switch causing certain movable parts within said machine to be enabled.

13. The method of claim 12 wherein said movable parts include paper sheet forwarding rollers for a printer and paper sheet forwarding rollers for transporting paper sheets over an optical reading portion.

14. The method of claim 12 wherein said first section contains a scanning print carriage, and said second section contains forwarding rollers for transporting paper sheets over an optical reading portion.

15. The method of claim 12 wherein said second section contains a scanning print carriage, and said first section contains forwarding rollers for transporting paper sheets over an optical reading portion.

16. A safety interlock system for a printing machine comprising:
   a safety interlock switch having terminals electrically connected to control circuitry within a housing, said control circuitry enabling a first group of mechanical components and a second group of mechanical components within said housing only when said switch is in an enable state, said switch being mounted on said housing so as to be actuated into said enable state only when both a first access door on said housing and a second access door on said housing are closed, opening said first access door allowing access to said first group of mechanical components, opening said second access door allowing access to said second group of mechanical components.

17. The system of claim 16 wherein said switch is mounted on said second access door and has an actuator protruding from said switch, wherein said system further comprises:
   a protuberance extending from said first access door which, when said first access door is closed, physically contacts said actuator on said switch to actuate said switch to its enable state as said second access door is closed after said first access door is closed.

18. The system of claim 17 wherein opening said first access door gains access to a scanning print carriage for printing on paper sheets, and opening said second access door gains access to a forwarding roller portion for transporting a sheet containing printed matter across an optical reading portion.

19. The system of claim 17 wherein said housing contains paper feed rollers, a scanning print carriage, and an optical reading portion, said housing having combined printer, facsimile, and copying functions.

20. The system of 16 wherein said switch is connected to a servo-processor, said servo-processor controlling one or more drive motors for paper feed rollers within said housing, said servo-processor enabling said drive motors upon detection that said switch is in an enable state.

* * * * *